United States Patent
Lombardo

(10) Patent No.: US 12,407,049 B2
(45) Date of Patent: Sep. 2, 2025

(54) LIFT DEVICE WITH INTERNALLY DEPLETABLE BATTERY

(71) Applicant: Oshkosh Corporation, Oshkosh, WI (US)

(72) Inventor: David Lombardo, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/813,521

(22) Filed: Aug. 23, 2024

(65) Prior Publication Data

US 2025/0070347 A1 Feb. 27, 2025

Related U.S. Application Data

(60) Provisional application No. 63/578,601, filed on Aug. 24, 2023.

(51) Int. Cl.
H01M 50/204 (2021.01)
H01M 10/42 (2006.01)
(Continued)

(52) U.S. Cl.
CPC ....... *H01M 50/204* (2021.01); *H01M 10/425* (2013.01); *H01M 10/441* (2013.01);
(Continued)

(58) Field of Classification Search
CPC . H01M 50/204; H01M 10/425; H01M 10/441
See application file for complete search history.

(56) References Cited

U.S. PATENT DOCUMENTS

| 5,196,998 A | 3/1993 | Fulton |
| 2004/0002794 A1 | 1/2004 | Pillar et al. |

(Continued)

FOREIGN PATENT DOCUMENTS

| CN | 201297304 Y | 8/2009 |
| CN | 201747694 U | 2/2011 |

(Continued)

OTHER PUBLICATIONS

Office Action issued in connection with PCT/US2024/043612 dated Oct. 17, 2024.
(Continued)

*Primary Examiner* — Jonathan G Jelsma
(74) *Attorney, Agent, or Firm* — FOLEY & LARDNER LLP

(57) ABSTRACT

A battery pack for a lift device includes a housing, battery cells, a resistor, a conductive element, and a member. The resistor is electrically coupled with a positive terminal of the battery cells. The conductive element is configured to transition between an open state in which a discharge path is not defined between the positive terminal of the battery cells and a negative terminal or a ground, and a closed state in which the discharge path is defined. The member is disposed at the opening and accessible from an exterior of the housing. The member is manually transitionable by a technician between a first state in which the conductive element is in the open state, and a second state in which the conductive element is driven into the closed state such that the battery cells discharge remaining electrical energy via the discharge path.

13 Claims, 12 Drawing Sheets

(51) Int. Cl.
*H01M 10/44* (2006.01)
*B60L 1/00* (2006.01)
*B66F 9/075* (2006.01)
*B66F 9/24* (2006.01)

(52) U.S. Cl.
CPC .......... *B60L 1/003* (2013.01); *B66F 9/07572* (2013.01); *B66F 9/24* (2013.01); *H01M 2220/20* (2013.01)

(56) References Cited

U.S. PATENT DOCUMENTS

| | | |
|---|---|---|
| 2005/0113996 A1 | 5/2005 | Pillar et al. |
| 2005/0234622 A1 | 10/2005 | Pillar et al. |
| 2008/0114513 A1 | 5/2008 | Pillar et al. |
| 2013/0257385 A1 | 10/2013 | Kim |
| 2013/0324982 A1 | 12/2013 | Smith et al. |
| 2014/0333238 A1* | 11/2014 | Yokoyama .......... H01M 50/244 318/139 |
| 2015/0130449 A1 | 5/2015 | Hans |
| 2015/0210313 A1 | 7/2015 | Sears et al. |
| 2015/0258906 A1 | 9/2015 | Ono |
| 2015/0259185 A1 | 9/2015 | Ditty |
| 2015/0375633 A1 | 12/2015 | Masuda |
| 2016/0075543 A1 | 3/2016 | Lombardo et al. |
| 2016/0221812 A1 | 8/2016 | Puszkiewicz et al. |
| 2018/0251354 A1 | 9/2018 | Mohlman et al. |
| 2019/0071291 A1 | 3/2019 | Puszkiewicz et al. |
| 2019/0077646 A1 | 3/2019 | Puszkiewicz et al. |
| 2019/0119088 A1 | 4/2019 | Puszkiewicz et al. |
| 2019/0177140 A1 | 6/2019 | Gilbride et al. |
| 2020/0003607 A1 | 1/2020 | Bafile et al. |
| 2020/0031641 A1 | 1/2020 | Puszkiewicz et al. |
| 2020/0079632 A1 | 3/2020 | Gilbert |
| 2020/0095105 A1 | 3/2020 | Yutzy et al. |
| 2020/0139804 A1 | 5/2020 | Holmes et al. |
| 2020/0140248 A1 | 5/2020 | Hackenberg et al. |
| 2020/0140249 A1 | 5/2020 | Hackenberg et al. |
| 2020/0232820 A1 | 7/2020 | Rosenegger et al. |
| 2020/0317065 A1 | 10/2020 | Lombardo |
| 2020/0317480 A1 | 10/2020 | Shankar et al. |
| 2020/0317488 A1 | 10/2020 | Bafile et al. |
| 2020/0317489 A1 | 10/2020 | Bhatia et al. |
| 2020/0317491 A1 | 10/2020 | Bafile et al. |
| 2020/0317492 A1 | 10/2020 | Bhatia et al. |
| 2020/0317493 A1 | 10/2020 | Lombardo et al. |
| 2021/0002112 A1 | 1/2021 | Puszkiewicz et al. |
| 2021/0039934 A1 | 2/2021 | Hackenberg et al. |
| 2021/0039935 A1 | 2/2021 | Hackenberg et al. |
| 2021/0040965 A1 | 2/2021 | Roth et al. |
| 2021/0070595 A1 | 3/2021 | Holmes et al. |
| 2021/0121340 A1 | 4/2021 | Malcolm et al. |
| 2021/0276423 A1 | 9/2021 | Lombardo et al. |
| 2021/0276845 A1 | 9/2021 | Gilbride et al. |
| 2021/0276847 A1 | 9/2021 | Neubauer et al. |
| 2021/0276848 A1 | 9/2021 | Miller et al. |
| 2021/0276850 A1 | 9/2021 | Lombardo et al. |
| 2021/0279991 A1 | 9/2021 | Shankar et al. |
| 2021/0369515 A1 | 12/2021 | Malcolm et al. |
| 2022/0000686 A1 | 1/2022 | Malcolm et al. |
| 2022/0135385 A1 | 5/2022 | Lombardo et al. |
| 2022/0204332 A1 | 6/2022 | Miller et al. |
| 2022/0211560 A1 | 7/2022 | Malcolm et al. |
| 2022/0234873 A1 | 7/2022 | Miller et al. |
| 2022/0315404 A1 | 10/2022 | Mohlman et al. |
| 2022/0348090 A1 | 11/2022 | Lombardo |
| 2022/0371864 A1 | 11/2022 | Shankar et al. |
| 2023/0150763 A1 | 5/2023 | Haberlein et al. |
| 2023/0151847 A1 | 5/2023 | Werries et al. |
| 2023/0159313 A1 | 5/2023 | Holmes et al. |
| 2023/0234456 A1 | 7/2023 | Messina et al. |
| 2023/0234462 A1 | 7/2023 | Messina et al. |
| 2023/0234821 A1 | 7/2023 | Messina et al. |
| 2023/0241989 A1 | 8/2023 | Ando |
| 2023/0256849 A1 | 8/2023 | Messina et al. |
| 2023/0264931 A1 | 8/2023 | Tressler et al. |
| 2023/0278425 A1 | 9/2023 | Miller et al. |
| 2023/0278842 A1 | 9/2023 | Mohlman et al. |
| 2023/0294528 A1 | 9/2023 | Messina et al. |
| 2023/0310235 A1 | 10/2023 | Malcolm et al. |
| 2023/0311666 A1 | 10/2023 | Miller et al. |
| 2023/0311768 A1 | 10/2023 | Chan et al. |
| 2023/0311916 A1 | 10/2023 | Chan et al. |
| 2023/0312236 A1 | 10/2023 | Miller et al. |
| 2023/0312237 A1 | 10/2023 | Miller et al. |
| 2023/0312317 A1 | 10/2023 | Puszkiewicz et al. |
| 2023/0316897 A1 | 10/2023 | Koga et al. |
| 2023/0347712 A1 | 11/2023 | Gentner et al. |
| 2023/0415641 A1 | 12/2023 | Miller et al. |
| 2023/0415742 A1 | 12/2023 | Wolf et al. |
| 2023/0415981 A1 | 12/2023 | Miller et al. |
| 2023/0415982 A1 | 12/2023 | Miller et al. |
| 2023/0415985 A1 | 12/2023 | Steffens et al. |
| 2023/0415986 A1 | 12/2023 | Steffens et al. |
| 2023/0416061 A1 | 12/2023 | Shankar et al. |
| 2024/0034608 A1 | 2/2024 | Lombardo et al. |
| 2024/0059537 A1 | 2/2024 | Lombardo et al. |
| 2024/0092620 A1 | 3/2024 | Gilbride et al. |
| 2024/0100962 A1 | 3/2024 | Lombardo |
| 2024/0124286 A1 | 4/2024 | Bhatia et al. |
| 2024/0228251 A1 | 7/2024 | Mohlman et al. |
| 2024/0238135 A1 | 7/2024 | Malcolm et al. |
| 2024/0278685 A1 | 8/2024 | Miller |
| 2024/0308832 A1 | 9/2024 | Shankar et al. |

FOREIGN PATENT DOCUMENTS

| | | |
|---|---|---|
| CN | 201747697 U | 2/2011 |
| CN | 115557437 A | 1/2023 |
| JP | 2001-220097 A | 8/2001 |
| WO | WO-2008/143664 A1 | 11/2008 |
| WO | WO-2022/023990 A1 | 2/2022 |
| WO | WO-2024/097298 A1 | 5/2024 |

OTHER PUBLICATIONS

International Search Report and Written Opinion issued in connection with PCT/US2024/043605 dated Dec. 17, 2024.

International Search Report and Written Opinion issued in connection with PCT/US2024/043608 dated Dec. 17, 2024.

Invitation to Pay Additional Fees issued in connection with PCT/US2024/043603 dated Dec. 11, 2024.

International Search Report and Written Opinion issued in connection with PCT/US2024/043570 dated Nov. 29, 2024.

International Search Report and Written Opinion issued in connection with PCT/US2024/043612 dated Dec. 9, 2024.

International Search Report and Written Opinion issued in connection with PCT/US2024/043603 dated Feb. 3, 2025.

Invitation to Pay Additional Fees issued in connection with PCT/US2024/043733 dated Dec. 12, 2024.

* cited by examiner

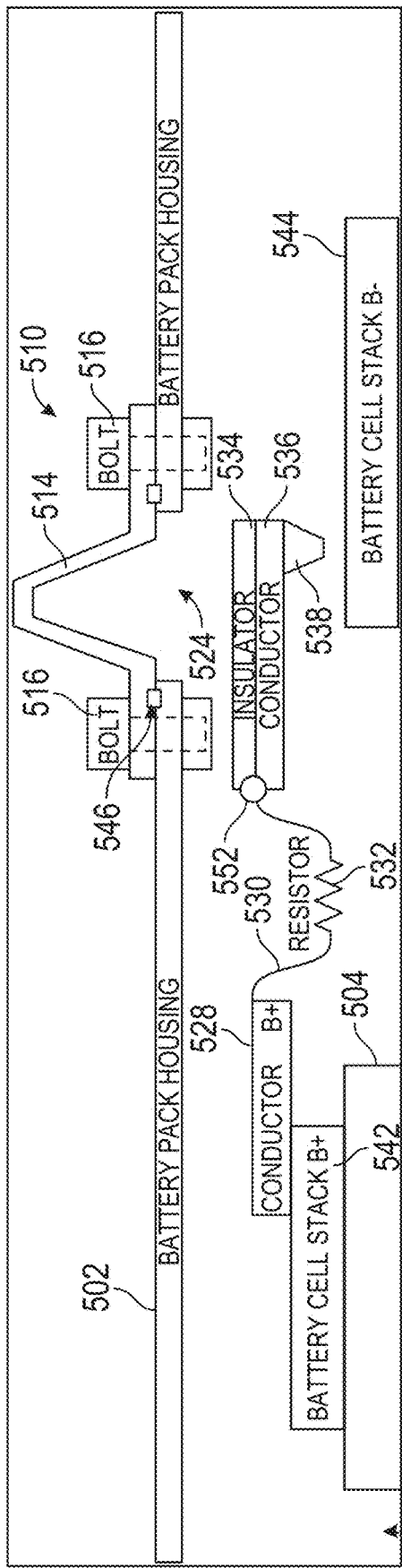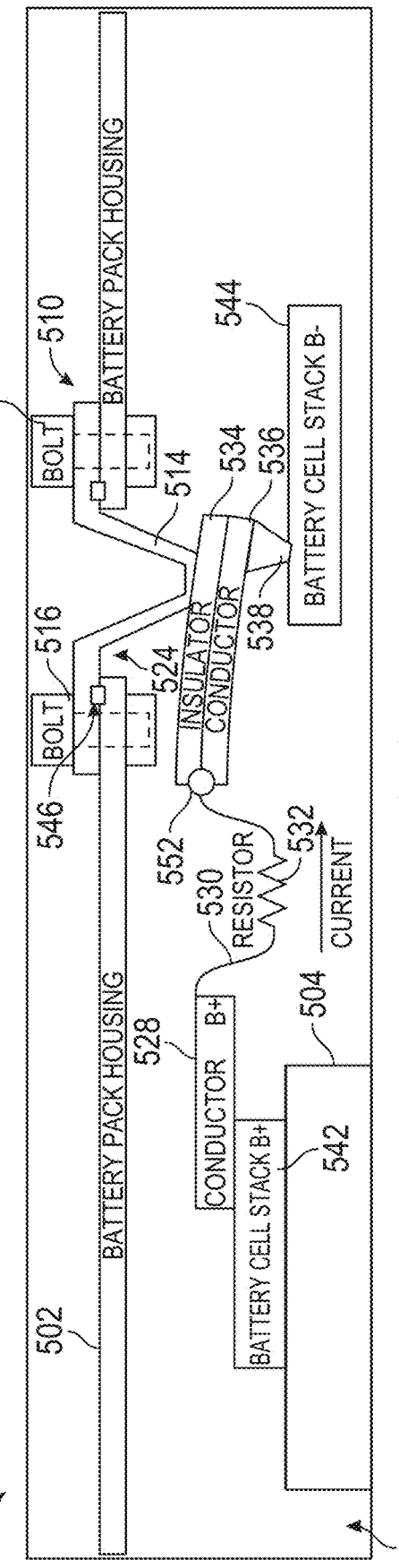
FIG. 10A
FIG. 10B

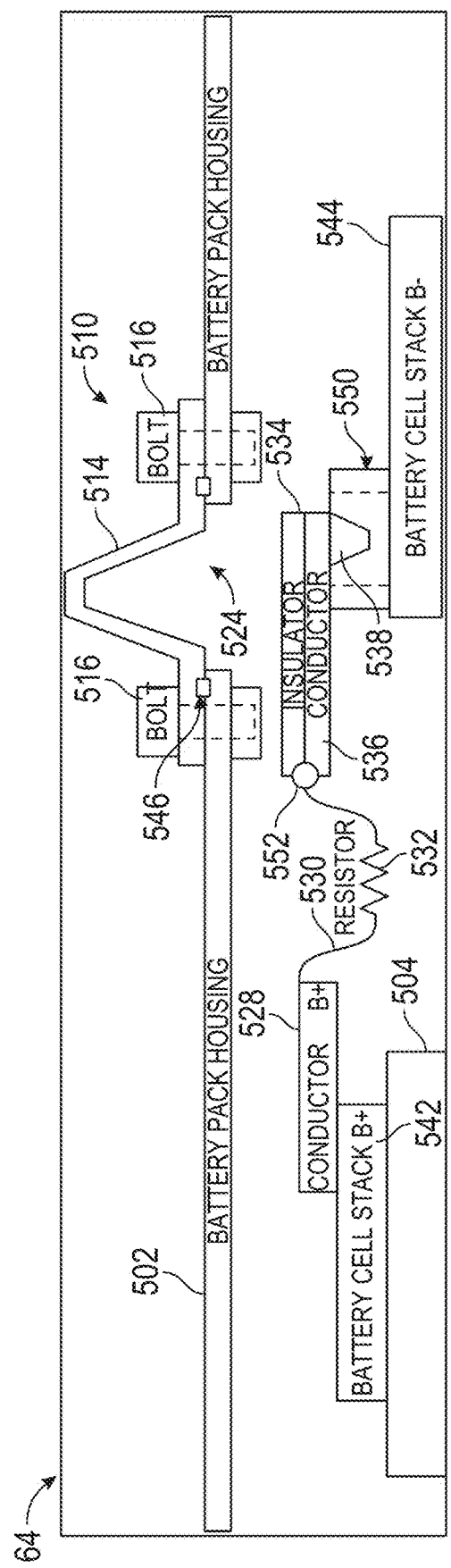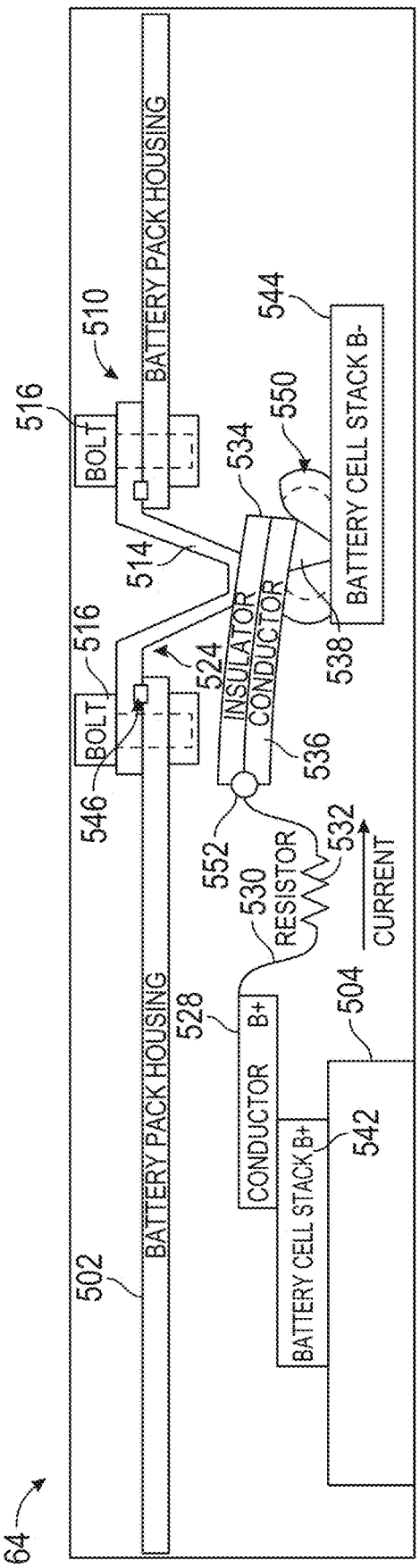

LIFT DEVICE WITH INTERNALLY DEPLETABLE BATTERY

CROSS-REFERENCE TO RELATED PATENT APPLICATION

This application claims the benefit of and priority to U.S. Provisional Application No. 63/578,601, filed Aug. 24, 2023, the entire disclosure of which is incorporated by reference herein.

BACKGROUND

The present disclosure relates to lift devices. More specifically, the present disclosure relates to energy storage systems for lift devices.

SUMMARY

One embodiment of the present disclosure is a battery pack for a lift device. The battery pack includes a housing, multiple battery cells, a resistor, a conductive element, and a member. The housing includes an opening. The battery cells are positioned within the housing. The resistor is electrically coupled with a positive terminal of the plurality of battery cells and is positioned within the housing. The conductive element is positioned within the housing and is configured to transition between an open state in which a discharge path is not defined between the positive terminal of the battery cells and a negative terminal or a ground, and a closed state in which the discharge path is defined between the positive terminal of the battery cells to the negative terminal or the ground through the resistor. The member is disposed at the opening and accessible from an exterior of the housing. The member is manually transitionable by a technician between a first state in which the conductive element is in the first state, and a second state in which the conductive element is driven into the second state such that the plurality of battery cells discharge remaining electrical energy via the discharge path.

In some embodiments, the member includes a plate having a protrusion in a center. In the first state, the member is fastened over the opening such that the protrusion is external to the housing. In the second state, the member is fastened over the opening such that the protrusion extends into the housing through the opening and drives the conductive element into the closed state.

In some embodiments, the member includes a screw configured to be received within the opening. The screw is configured to be accessed from the exterior of the housing by the technician such that the screw is driven to rotate to translate into the second state to bias the conductive element into the closed state.

In some embodiments, the conductive element includes a cantilever beam having a fixed end and a free end. The conductive element is configured to be driven by the member to bend such that a protrusion of the free end engages the negative terminal or the ground in the closed state.

In some embodiments, the battery pack includes an insulator disposed on a side of the conductive element opposite a side from which a protrusion extends. The member is configured to engage the insulator to transition the conductive element from the open state to the closed state.

In some embodiments, the battery pack includes a spacer disposed on a tip of the conductive element. The spacer is configured to align the tip of the conductive element and deform as the conductive element is driven by the member to the closed state. In some embodiments, conductive element includes a cantilever beam having a fixed end coupled with the housing and a free end configured to be driven to engage the negative terminal or the ground in the closed state.

Another embodiment of the present disclosure is a lift device. The lift device includes a lift assembly, and a battery pack. The lift assembly is configured to raise or lower. The battery pack is configured to provide electrical energy to the lift assembly. The battery pack includes a housing, battery cells, a resistor, a conductive element, and a member. The housing includes an opening. The battery cells are positioned within the housing. The resistor is electrically coupled with a positive terminal of the battery cells and is positioned within the housing. The conductive element is positioned within the housing and is configured to transition between an open state in which a discharge path is not defined between the positive terminal of the battery cells and a negative terminal or a ground, and a closed state in which the discharge path is defined between the positive terminal of the battery cells to the negative terminal or the ground through the resistor. The member is disposed at the opening and is accessible from an exterior of the housing. The member is manually transitionable by a technician between a first state in which the conductive element is in the first state, and a second state in which the conductive element is driven into the second state such that the battery cells discharge remaining electrical energy via the discharge path.

In some embodiments, the member includes a plate having a protrusion in a center. In the first state the member is fastened over the opening such that the protrusion is external to the housing. In the second state, the member is fastened over the opening such that the protrusion extends into the housing through the opening and drives the conductive element into the closed state.

In some embodiments, the member includes a screw configured to be received within the opening. The screw is configured to be accessed from the exterior of the housing by the technician such that the screw is driven to rotate to translate into the second state to bias the conductive element into the closed state.

In some embodiments, the conductive element includes a cantilever beam having a fixed end and a free end. The conductive element is configured to be driven by the member to bend such that a protrusion of the free end engages the negative terminal or the ground in the closed state.

In some embodiments, the battery pack comprises an insulator disposed on a side of the conductive element opposite a side from which a protrusion extends. The member is configured to engage the insulator to transition the conductive element from the open state to the closed state.

In some embodiments, the battery pack further includes a spacer disposed on a tip of the conductive element. The spacer is configured to align the tip of the conductive element and deform as the conductive element is driven by the member to the closed state.

In some embodiments, the conductive element includes a cantilever beam having a fixed end coupled with the housing and a free end configured to be driven to engage the negative terminal or the ground in the closed state. In some embodiments, the lift device is a fully electric boom.

Another embodiment of the present disclosure is a method of completely discharging a battery. The method includes providing a device including a removable battery. The removable battery includes a member configured to be transitioned between a first state and a second state. The method also includes performing an operation with the device using energy provided by the removable battery. The method also includes removing the removable battery from the device. The method also includes transitioning the member from the first state into the second state such that a discharge electrical path is defined across terminals of cells of the removable battery through a resistor to completely discharge the cells of the removable battery.

In some embodiments, transitioning the member from the first state to the second state includes removing the member from a side of a housing of the removable battery. The member includes a protrusion on one side with the protrusion oriented in an outwards direction when the member is in the first state. The method also includes re-orienting and reinstalling the member in the second state on the side of the housing such that the protrusion extends through an opening in the housing of the removable battery and biases a conductive member to contact a negative terminal or ground of the removable battery such that energy is depleted from cells of the removable battery through a resistor.

In some embodiments, transitioning the member from the first state to the second state includes screwing the member into a side of a housing of the removable battery such that the member protrudes further into the removable battery and drives a conductive member to contact a negative terminal or ground of the removable battery such that energy is depleted from cells of the removable battery through a resistor. In some embodiments, transitioning the member from the first state to the second state drives a conductive member having the form of a cantilever beam into engagement with a ground or a negative terminal of the removable battery. The conductive member is electrically coupled with a positive terminal of the removable battery through a resistor. In some embodiments, transitioning the member from the first state to the second state includes removing a fastener that couples the member with a side of a housing of the removable battery, re-orienting the member, and re-installing the fastener.

BRIEF DESCRIPTION OF THE DRAWINGS

FIG. 10A is a sectional view of an interior of the battery of FIG. 5 including a discharge mechanism, with the member of FIG. 7 in the first position, according to some embodiments.

FIG. 10B is a sectional view of the interior of the battery of FIG. 5 including the discharge mechanism, with the member of FIG. 7 in the second position, according to some embodiments.

FIG. 11A is a sectional view of the interior of the battery of FIG. 5 including a discharge mechanism that includes a spacer, with the member of FIG. 7 in the first position, according to some embodiments.

FIG. 11B is a sectional view of the interior of the battery of FIG. 5 including the discharge mechanism that includes the spacer, with the member of FIG. 7 in the second position, according to some embodiments.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the FIGURES, a lift device includes a battery having multiple cells positioned within a housing that are configured to receive, store, and discharge electrical energy for one or more electrical loads of the lift device (e.g., an electric motor, an electric linear actuator, lighting devices, controllers, etc.). The battery includes a mechanism that is configured to be manually activated in order to discharge the cells of the battery (e.g., to convert the electrical energy into heat). In some embodiments, when the battery is about to be transported (e.g., due to defects, servicing, or end-of-life conditions), the mechanism can be manually activated in order to ensure that the cells of the battery are completely or substantially depleted of energy before handling and shipping of the battery.

Lift Device

Figure 1:
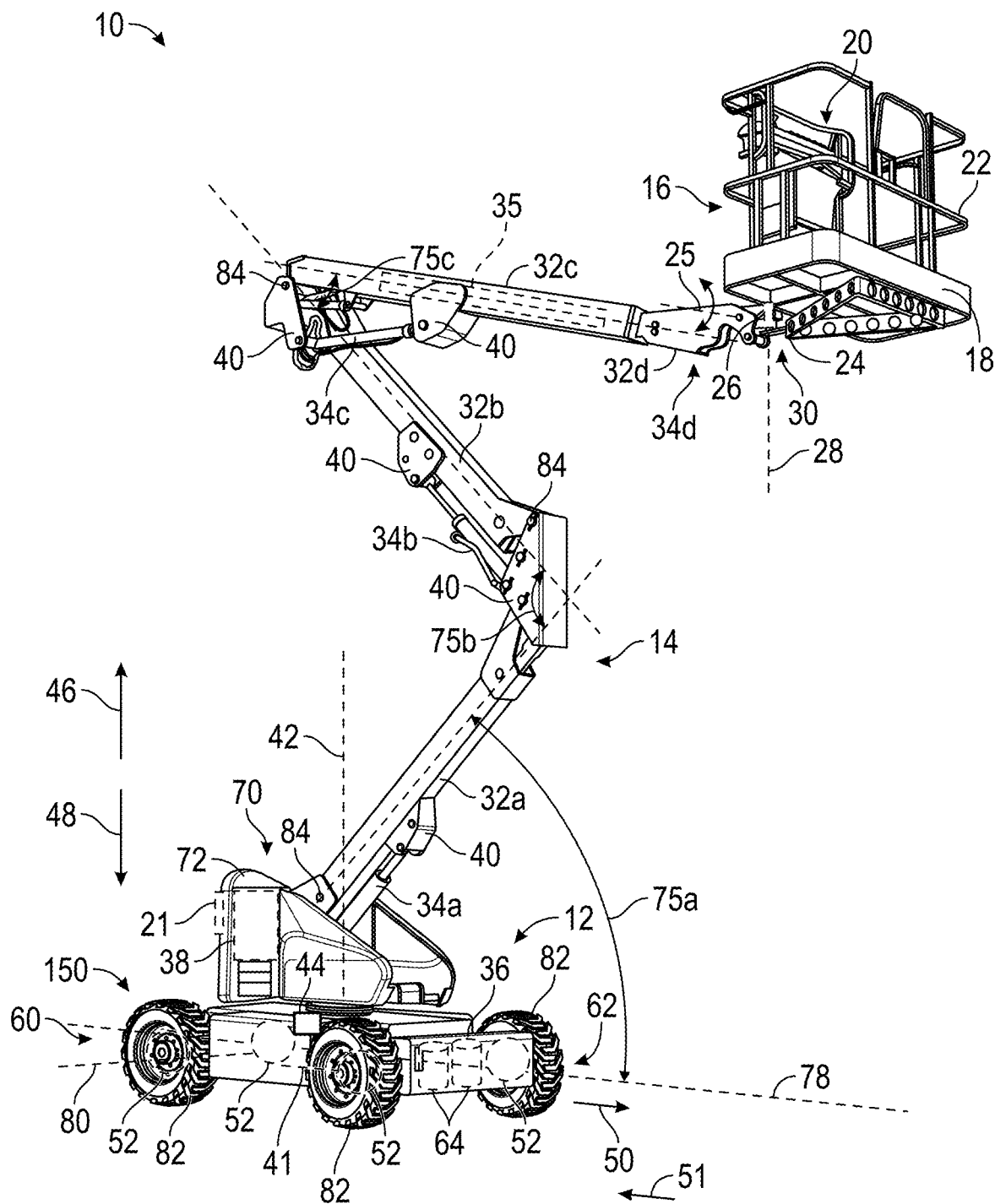
FIG. 1 is a perspective view of a lift device, according to some embodiments.

Referring to FIG. 1, a lifting apparatus, lift device, or mobile elevating work platform (MEWP) (e.g., a telehandler, an electric boom lift, a towable boom lift, a lift device, a fully electric boom lift, etc.), shown as lift device 10 includes a base assembly 12 (e.g., a base, a support assembly, a drivable support assembly, a support structure, a chassis, etc.), a platform assembly 16 (e.g., a platform, a terrace, etc.), and a lift assembly 14 (e.g., a boom, a boom lift assembly, a lifting apparatus, an articulated arm, a scissors lift, etc.). The lift device 10 includes a front end (e.g., a forward-facing end, a front portion, a front, etc.), shown as front 62, and a rear end (e.g., a rearward facing end, a back portion, a back, a rear, etc.,) shown as rear 60. The lift assembly 14 is configured to elevate the platform assembly 16 in an upward direction 46 (e.g., an upward vertical direction) relative to the base assembly 12. The lift assembly 14 is also configured to translate the platform assembly 16 in a downward direction 48 (e.g., a downward vertical direction). The lift assembly 14 is also configured to translate the platform assembly 16 in either a forward direction 50 (e.g., a forward longitudinal direction) or a rearward direction 51 (e.g., a rearward longitudinal direction). The lift assembly 14 generally facilitates performing a lifting function to raise and lower the platform assembly 16, as well as movement of the platform assembly 16 in various directions.

The base assembly 12 defines a longitudinal axis 78 and a lateral axis 80. The longitudinal axis 78 defines the forward direction 50 of lift device 10 and the rearward direction 51. The lift device 10 is configured to translate in the forward direction 50 and to translate backwards in the rearward direction 51. The base assembly 12 includes one or more wheels, tires, wheel assemblies, tractive elements, rotary elements, treads, etc., shown as tractive elements 82. The tractive elements 82 are configured to rotate to drive (e.g., propel, translate, steer, move, etc.) the lift device 10. The tractive elements 82 can each include an electric motor 52 (e.g., electric wheel motors) configured to drive the tractive elements 82 (e.g., to rotate tractive elements 82 to facilitate motion of the lift device 10). In other embodiments, the tractive elements 82 are configured to receive power (e.g., rotational mechanical energy) from electric motors 52 or through a drive train (e.g., a combination of any number and configuration of a shaft, an axle, a gear reduction, a gear train, a transmission, etc.). In some embodiments, one or more tractive elements 82 are driven by a prime mover 41 (e.g., electric motor, internal combustion engine, etc.) through a transmission. In some embodiments, a hydraulic system (e.g., one or more pumps, hydraulic motors, conduits, valves, etc.) transfers power (e.g., mechanical energy) from one or more electric motors 52 and/or the prime mover 41 to the tractive elements 82. The tractive elements 82 and electric motors 52 (or prime mover 41) can facilitate a driving and/or steering function of the lift device 10. In some embodiments, the electric motors 52 are optional, and the tractive elements 82 are powered or driven by an internal combustion engine.

Figure 4:
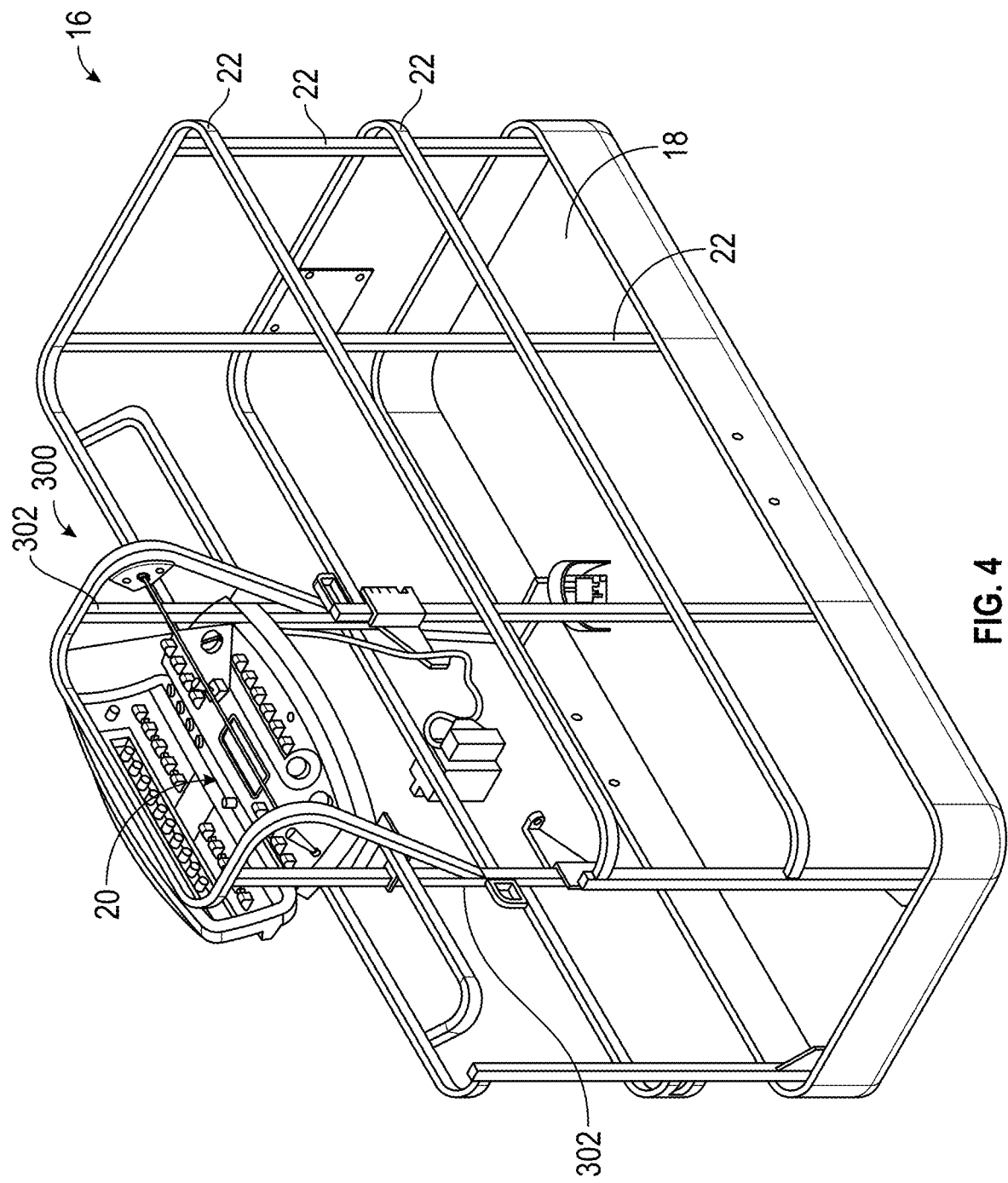
FIG. 4 is a perspective view of a platform assembly of the lift device of FIG. 1, according to some embodiments.
Figure 5:
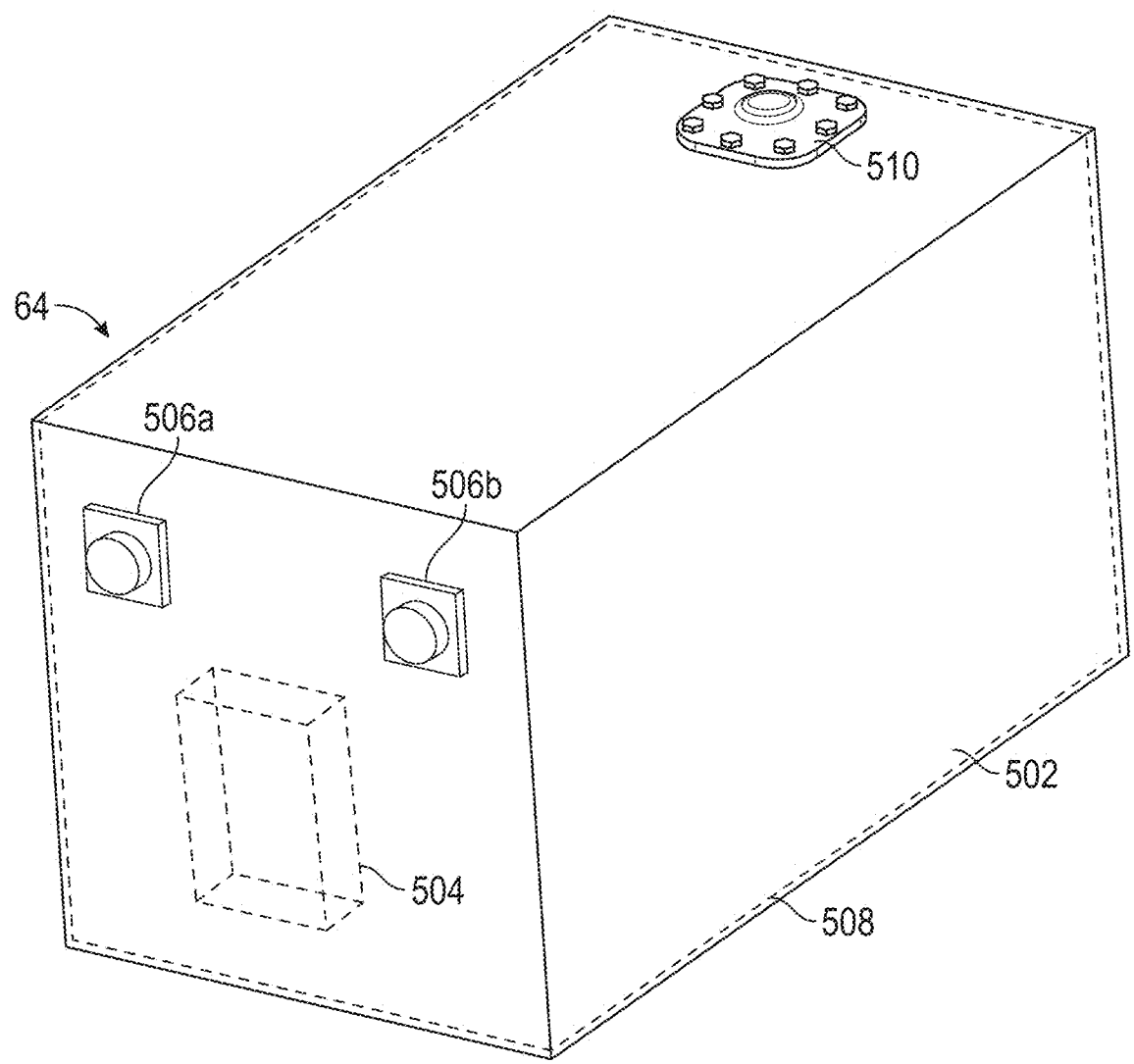
FIG. 5 is a perspective view of a battery of the lift device of FIG. 1, according to some embodiments.

With additional reference to FIG. 4, the platform assembly 16 is shown in further detail. The platform assembly 16 is configured to provide a work area for an operator of the lift device 10 to stand/rest upon. The platform assembly 16 can be pivotally coupled to an upper end of the lift assembly 14. The lift device 10 is configured to facilitate the operator accessing various elevated areas (e.g., lights, platforms, the sides of buildings, building scaffolding, trees, power lines, etc.). The lift device 10 may use various electrically-powered motors and electrically-powered linear actuators or hydraulic cylinders to facilitate elevation and/or horizontal movement (e.g., lateral movement, longitudinal movement) of the platform assembly 16 (e.g., relative to the base assembly 12, or to a ground surface that the base assembly 12 rests upon). In some embodiments, the lift device 10 uses internal combustion engines, hydraulics, a hydraulic system, pneumatic cylinders, etc.

The platform assembly 16 includes a base member, a base portion, a platform, a standing surface, a shelf, a work platform, a floor, a deck, etc., shown as a deck 18. The deck 18 provides a space (e.g., a floor surface) for a worker to stand upon as the platform assembly 16 is raised and lowered.

The platform assembly 16 includes a railing assembly including various members, beams, bars, guard rails, rails, railings, etc., shown as rails 22. The rails 22 extend along substantially an entire perimeter of the deck 18. The rails 22 provide one or more members for the operator of the lift device 10 to grasp while using the lift device 10 (e.g., to grasp while operating the lift device 10 to elevate the platform assembly 16). The rails 22 can include members that are substantially horizontal to the deck 18. The rails 22 can also include vertical structural members that couple with the substantially horizontal members. The vertical structural members can extend upwards from the deck 18.

The platform assembly 16 can include a human machine interface (HMI) (e.g., a user interface, an operator interface, etc.), shown as the user interface 20. The user interface 20 is configured to receive user inputs from the operator at or upon the platform assembly 16 to facilitate operation of the lift device 10. The user interface 20 can include any number of buttons, levers, switches, keys, etc., or any other user input device configured to receive a user input to operate the lift device 10. The user interface 20 may also provide information to the user (e.g., through one or more displays, lights, speakers, haptic feedback devices, etc.). The user interface 20 can be supported by one or more of the rails 22.

Referring to FIG. 1, the platform assembly 16 includes a frame 24 (e.g., structural members, support beams, a body, a structure, etc.) that extends at least partially below the deck 18. The frame 24 can be integrally formed with the deck 18. The frame 24 is configured to provide structural support for the deck 18 of the platform assembly 16. The frame 24 can include any number of structural members (e.g., beams, bars, I-beams, etc.) to support the deck 18. The frame 24 couples the platform assembly 16 with the lift assembly 14. The frame 24 may be rotatably or pivotally coupled with the lift assembly 14 to facilitate rotation of the platform assembly 16 about an axis 28 (e.g., a vertical axis). The frame 24 can also rotatably/pivotally couple with the lift assembly 14 such that the frame 24 and the platform assembly 16 can pivot about an axis 25 (e.g., a horizontal axis).

The lift assembly 14 includes one or more beams, articulated arms, bars, booms, arms, support members, boom sections, cantilever beams, etc., shown as lift arms 32a, 32b, and 32c. The lift arms are hingedly or rotatably coupled with each other at their ends. The lift arms can be hingedly or rotatably coupled to facilitate articulation of the lift assembly 14 and raising/lowering and/or horizontal movement of the platform assembly 16. The lift device 10 includes a lower lift arm 32a, a central or medial lift arm 32b, and an upper lift arm 32c. The lower lift arm 32a is configured to hingedly or rotatably couple at one end with the base assembly 12 to facilitate lifting (e.g., elevation) of the platform assembly 16. The lower lift arm 32a is configured to hingedly or rotatably couple at an opposite end with the medial lift arm 32b. Likewise, the medial lift arm 32b is configured to hingedly or rotatably couple with the upper lift arm 32c. The upper lift arm 32c can be configured to hingedly interface/couple and/or telescope with an intermediate lift arm 32d. The upper lift arm 32c can be referred to as "the jib" of the lift device 10. The intermediate lift arm 32d may extend into an inner volume of the upper lift arm 32c and extend and/or retract. The lower lift arm 32a and the medial lift arm 32b may be referred to as "the boom" of the overall lift device 10 assembly. The intermediate lift arm 32d can be configured to couple (e.g., rotatably, hingedly, etc.), with the platform assembly 16 to facilitate levelling of the platform assembly 16.

The lift arms 32 are driven to hinge or rotate relative to each other by actuators 34a, 34b, 34c, and 34d (e.g., electric linear actuators, linear electric arm actuators, hydraulic cylinders, etc.). The actuators 34a, 34b, 34c, and 34d can be mounted between adjacent lift arms to drive adjacent lift arms to hinge or pivot (e.g., rotate some angular amount) relative to each other about pivot points 84. The actuators 34a, 34b, 34c, and 34d can be mounted between adjacent lift arms using any of a foot bracket, a flange bracket, a clevis bracket, a trunnion bracket, etc. The actuators 34*a*, 34*b*, 34*c*, and 34*d* may be configured to extend or retract (e.g., increase in overall length, or decrease in overall length) to facilitate pivoting adjacent lift arms to pivot/hinge relative to each other, thereby articulating the lift arms and raising or lowering the platform assembly 16.

The actuators 34*a*, 34*b*, 34*c*, and 34*d* can be configured to extend (e.g., increase in length) to increase a value of an angle formed between adjacent lift arms 32. The angle can be defined between centerlines of adjacent lift arms 32 (e.g., centerlines that extend substantially through a center of the lift arms 32). For example, the actuator 34*a* is configured to extend/retract to increase/decrease the angle 75*a* defined between a centerline of the lower lift arm 32*a* and the longitudinal axis 78 (angle 75*a* can also be defined between the centerline of the lower lift arm 32*a* and a plane defined by the longitudinal axis 78 and lateral axis 80) and facilitate lifting of the platform assembly 16 (e.g., moving the platform assembly 16 at least partially along the upward direction 46). Likewise, the actuator 34*b* can be configured to retract to decrease the angle 75*a* to facilitate lowering of the platform assembly 16 (e.g., moving the platform assembly 16 at least partially along the downward direction 48). Similarly, the actuator 34*b* is configured to extend to increase the angle 75*b* defined between centerlines of the lower lift arm 32*a* and the medial lift arm 32*b* and facilitate elevating of the platform assembly 16. Similarly, the actuator 34*b* is configured to retract to decrease the angle 75*b* to facilitate lowering of the platform assembly 16. The electric actuator 34*c* is similarly configured to extend/retract to increase/decrease the angle 75*c*, respectively, to raise/lower the platform assembly 16. The actuators 34 may be hydraulic actuators, electric actuators, pneumatic actuators, etc.

The actuators 34*a*, 34*b*, 34*c*, and 34*d* can be mounted (e.g., rotatably coupled, pivotally coupled, etc.) to adjacent lift arms at mounts 40 (e.g., mounting members, mounting portions, attachment members, attachment portions, etc.). The mounts 40 can be positioned at any position along a length of each lift arm. For example, the mounts 40 can be positioned at a midpoint of each lift arm, and a lower end of each lift arm.

The intermediate lift arm 32*d* and the frame 24 are configured to pivotally interface/couple at a platform rotator 30 (e.g., a rotary actuator, a rotational electric actuator, a gear box, etc.). The platform rotator 30 facilitates rotation of the platform assembly 16 about the axis 28 relative to the intermediate lift arm 32*d*. In some embodiments, the platform rotator 30 is positioned between the frame 24 and the upper lift arm 32*c* and facilitates pivoting of the platform assembly 16 relative to the upper lift arm 32*c*. The axis 28 extends through a central pivot point of the platform rotator 30. The intermediate lift arm 32*d* can also be configured to articulate or bend such that a distal portion of the intermediate lift arm 32*d* pivots/rotates about the axis 25. The intermediate lift arm 32*d* can be driven to rotate/pivot about axis 25 by extension and retraction of the actuator 34*d*.

The intermediate lift arm 32*d* is also configured to extend/retract (e.g., telescope) along the upper lift arm 32*c*. In some embodiments, the lift assembly 14 includes a linear actuator (e.g., a hydraulic cylinder, an electric linear actuator, etc.), shown as extension actuator 35, that controls extension and retraction of the intermediate lift arm 32*d* relative to the upper lift arm 32*c*. In other embodiments, one more of the other arms of the lift assembly 14 include multiple telescoping sections that are configured to extend/retract relative to one another.

The platform assembly 16 is configured to be driven to pivot about the axis 28 (e.g., rotate about axis 28 in either a clockwise or a counter-clockwise direction) by an electric or hydraulic motor 26 (e.g., a rotary electric actuator, a stepper motor, a platform rotator, a platform electric motor, an electric platform rotator motor, etc.). The motor 26 (e.g., the pivot motor 26) can be configured to drive the frame 24 to pivot about the axis 28 relative to the upper lift arm 32*c* (or relative to the intermediate lift arm 32*d*). The motor 26 can be configured to drive a gear train to pivot the platform assembly 16 about the axis 28.

Figure 2:
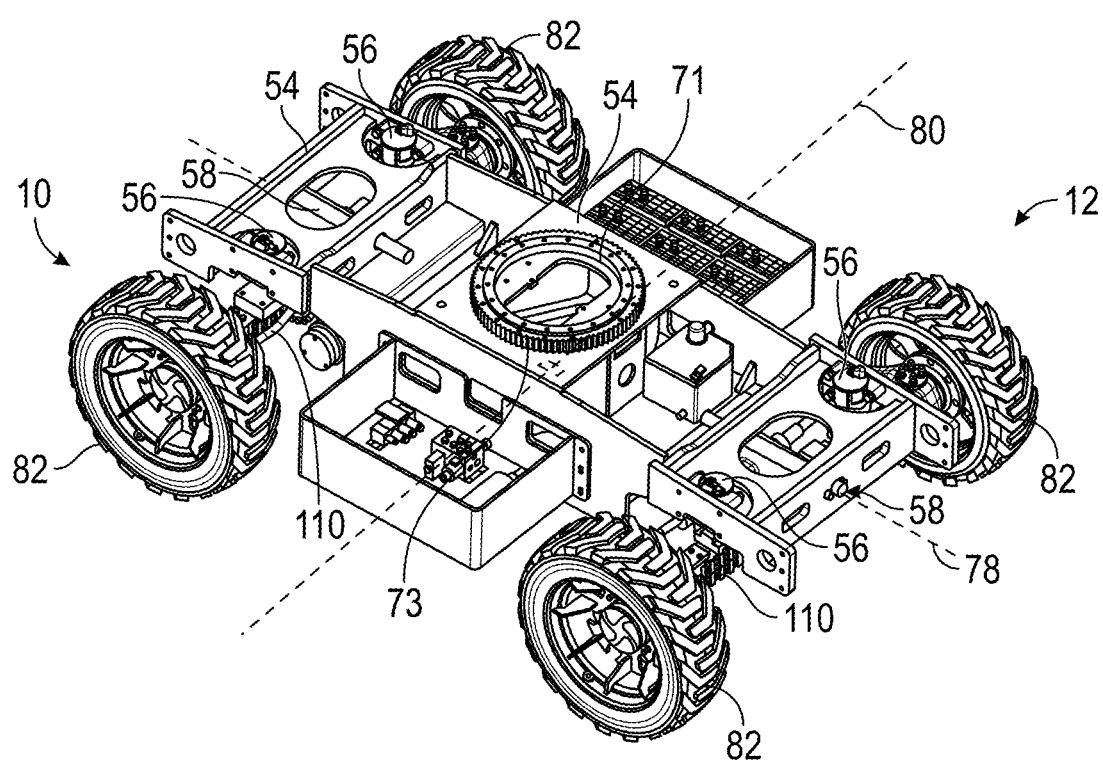
FIG. 2 is a perspective view of a base of the lift device of FIG. 1, according to some embodiments.

Referring to FIGS. 1 and 2, the lift assembly 14 is configured to pivotally or rotatably couple with the base assembly 12. The base assembly 12 includes a rotatable base member, a rotatable platform member, a fully electric turntable, etc., shown as a turntable 70. The lift assembly 14 is configured to rotatably/pivotally couple with the base assembly 12. The turntable 70 is rotatably coupled with a base, frame, structural support member, carriage, etc., of base assembly 12, shown as base 36. The turntable 70 is configured to rotate or pivot relative to the base 36. The turntable 70 can pivot/rotate about the central axis 42 relative to base 36, about a slew bearing 71 (e.g., the slew bearing 71 pivotally couples the turntable 70 to the base 36). The turntable 70 facilitates accessing various elevated and angularly offset locations at the platform assembly 16. The turntable 70 is configured to be driven to rotate or pivot relative to base 36 and about the slew bearing 71 by an electric motor, an electric turntable motor, an electric rotary actuator, a hydraulic motor, etc., shown as the turntable motor 44. The turntable motor 44 can be configured to drive a geared outer surface 73 of the slew bearing 71 that is rotatably coupled to the base 36 about the slew bearing 71 to rotate the turntable 70 relative to the base 36. The lower lift arm 32*a* is pivotally coupled with the turntable 70 (or with a turntable member 72 of the turntable 70) such that the lift assembly 14 and the platform assembly 16 rotate as the turntable 70 rotates about the central axis 42. In some embodiments, the turntable 70 is configured to rotate a complete 360 degrees about the central axis 42 relative to the base 36. In other embodiments, the turntable 70 is configured to rotate an angular amount less than 360 degrees about the central axis 42 relative to the base 36 (e.g., 270 degrees, 120 degrees, etc.).

The base assembly 12 includes one or more energy storage devices or power sources (e.g., capacitors, batteries, Lithium-Ion batteries, Nickel Cadmium batteries, fuel tanks, etc.), shown as batteries 64 (e.g., battery packs). The batteries 64 are configured to store energy in a form (e.g., in the form of chemical energy) that can be converted into electrical energy for the various electric motors and actuators of the lift device 10. The batteries 64 can be stored within the base 36. The lift device 10 includes a controller 38 that is configured to operate any of the motors, actuators, etc., of the lift device 10. The controller 38 can be configured to receive sensory input information from various sensors of the lift device 10, user inputs from the user interface 20 (or any other user input device such as a key-start or a push-button start), etc. The controller 38 can be configured to generate control signals for the various motors, actuators, etc., of the lift device 10 to operate any of the motors, actuators, electrically powered movers, etc., of the lift device 10. The batteries 64 are configured to power any of the motors, sensors, actuators, electric linear actuators, electrical devices, electrical movers, stepper motors, etc., of the lift device 10. The base assembly 12 can include a power circuit including any necessary transformers, resistors, transistors, thermistors, capacitors, etc., to provide appropriate power (e.g., electrical energy with appropriate current and/or appropriate voltage) to any of the motors, electric actuators, sensors, electrical devices, etc., of the lift device 10.

The batteries 64 are configured to deliver power to the motors 52 to drive the tractive elements 82. A rear set of tractive elements 82 can be configured to pivot to steer the lift device 10. In other embodiments, a front set of tractive elements 82 are configured to pivot to steer the lift device 10. In still other embodiments, both the front and the rear set of tractive elements 82 are configured to pivot (e.g., independently) to steer the lift device 10. In some examples, the base assembly 12 includes a steering system 150. The steering system 150 is configured to drive tractive elements 82 to pivot for a turn of the lift device 10. The steering system 150 can be configured to pivot the tractive elements 82 in pairs (e.g., to pivot a front pair of tractive elements 82), or can be configured to pivot tractive elements 82 independently (e.g., four-wheel steering for tight-turns).

It should be understood that while the lift device 10 as described herein is described with reference to batteries, electric motors, etc., the lift device 10 can be powered (e.g., for transportation and/or lifting the platform assembly 16) using one or more internal combustion engines, electric motors or actuators, hydraulic motors or actuators, pneumatic actuators, or any combination thereof.

In some embodiments, the base assembly 12 also includes a user interface 21 (e.g., a HMI, a user interface, a user input device, a display screen, etc.). In some embodiments, the user interface 21 is coupled to the base 36. In other embodiments, the user interface 21 is positioned on the turntable 70. The user interface 21 can be positioned on any side or surface of the base assembly 12 (e.g., on the front 62 of the base 36, on the rear 60 of the base 36, etc.).

Figure 3:
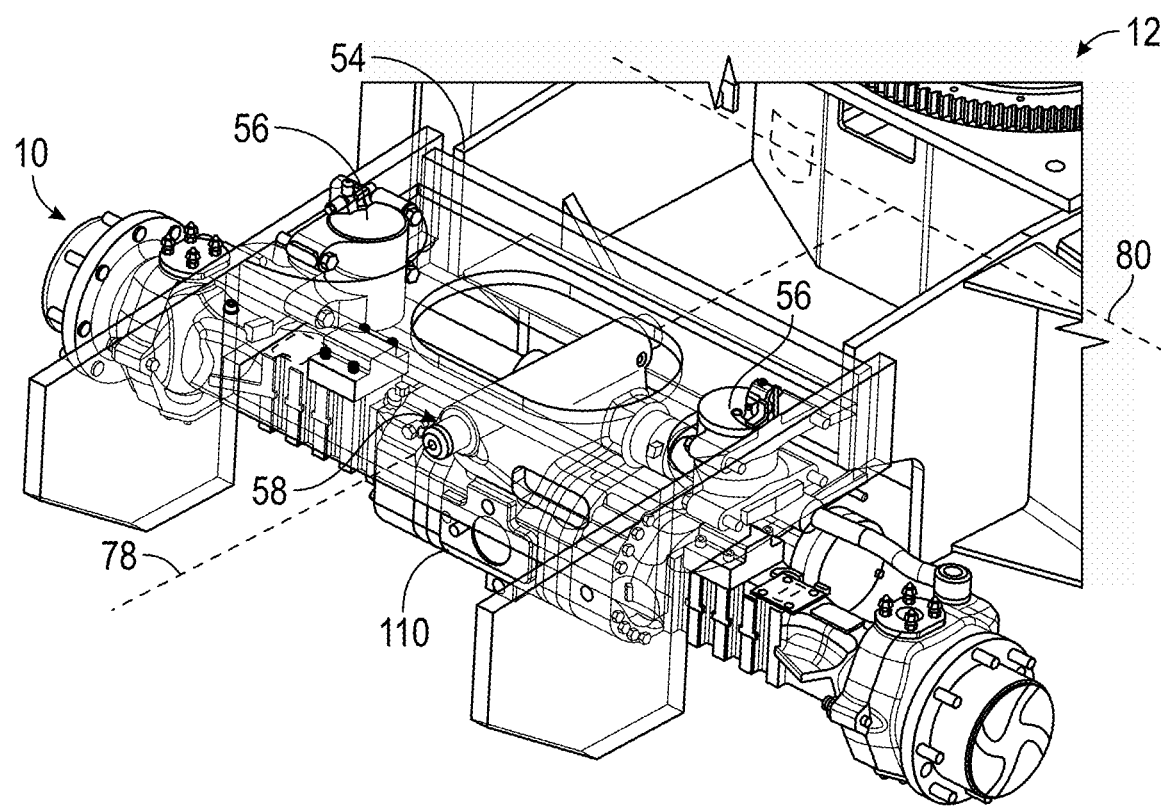
FIG. 3 is a perspective view of an axle assembly of the lift device of FIG. 1, according to some embodiments.

Referring now to FIGS. 2 and 3, the base assembly 12 includes a longitudinally extending frame member 54 (e.g., a rigid member, a structural support member, an axle, a base, a frame, a carriage, a chassis, etc.). The longitudinally extending frame member 54 provides structural support for the turntable 70 as well as the tractive elements 82. The longitudinally extending frame member 54 is pivotally coupled with lateral frame members 110 (e.g., axles, frame members, beams, bars, etc.) at opposite longitudinal ends of the longitudinally extending frame member 54. For example, the lateral frame members 110 may be pivotally coupled with the longitudinally extending frame member 54 at a front end and a rear end of the longitudinally extending frame member 54. The lateral frame members 110 can each be configured to pivot about a pivot joint 58 (e.g., about a longitudinal axis). The pivot joint 58 can include a pin and a receiving portion (e.g., a bore, an aperture, etc.). The pin of the pivot joint 58 is coupled to one of the lateral frame members 110 (e.g., a front lateral frame member 110 or a rear lateral frame member 110) or the longitudinally extending frame member 54 and the receiving portion is coupled to the other of the longitudinally extending frame member 54 and the lateral frame member 110. For example, the pin may be coupled with longitudinally extending frame member 54 and the receiving portion can be coupled with one of the lateral frame members 110 (e.g., integrally formed with the front lateral frame member 110).

In some embodiments, the longitudinally extending frame member 54 and the lateral frame members 110 are integrally formed or coupled (e.g., fastened, welded, riveted, etc.) to define the base 36. In still other embodiments, the base 36 is integrally formed with the longitudinally extending frame member 54 and/or the lateral frame members 110. In still other embodiments, the base 36 is coupled with the longitudinally extending frame member 54 and/or the lateral frame members 110.

The base assembly 12 includes one or more axle actuators 56 (e.g., electric linear actuators, electric axle actuators, electric levelling actuators, hydraulic cylinders, etc.). The axle actuators 56 can be linear actuators configured to receive power from the batteries 64, for example. The axle actuators 56 can be configured to extend or retract to contact a top surface of a corresponding one of the lateral frame members 110. When the axle actuators 56 extend, an end of a rod of the levelling actuators can contact the surface of lateral frame member 110 and prevent relative rotation between lateral frame member 110 and longitudinally extending frame member 54. In this way, the relative rotation/pivoting between the lateral frame member 110 and the longitudinally extending frame member 54 can be locked (e.g., to prevent rolling of the longitudinally extending frame member 54 relative to the lateral frame members 110 during operation of the lift assembly 14). The axle actuators 56 can receive power from the batteries 64, which can allow the axle actuators 56 to extend or retract. The axle actuators 56 receive control signals from controller 38.

Manually Dischargeable Batteries

Referring to FIGS. 5-11, the batteries 64 may each include a housing 502 (e.g., a shell, a structure, a modular unit, walls, sidewalls, an enclosure, a container, a capsule, a cover, a case, a covering, casing, a hull, etc.), that defines an inner volume 508 (e.g., a space, a void, an area, etc.) within which one more cells 504 (e.g., battery cells, energy storage cells, alkaline cells, lithium ion cells, etc.) are positioned. The cells 504 may be electrically coupled (e.g., via wiring) with one or more terminals 506 (e.g., a positive terminal 506a and a negative terminal 506b) that are accessible from an exterior of the housing 502 in order to discharge electrical energy for devices (e.g., actuators, motors, etc.) that consume electrical energy in order to operate (e.g., electrical components of the lift device 10). In some embodiments, the batteries 64 each include a connector or power connector such that the cells 504 of the batteries 64 can be quickly electrically coupled or de-coupled with other batteries 64 of the lift device 10 or with an energy distribution and discharge system of the lift device 10. The batteries 64 may be high-voltage or low-voltage batteries 64 configured to supply electrical energy for one or more high-voltage or low-voltage electrical devices of the lift device 10.

Referring particularly to FIGS. 5-9, the battery 64 may include a cap (e.g., a cover, a stopper, a lid, atop, a plug, etc.), shown as manual discharge member 510. The manual discharge member 510 may be a structural member that functions to both initiate a manual discharge and as a housing member that seals with the housing 502 and forms or defines a portion of the housing 502. In some embodiments, the manual discharge member 510 is a removable, adjustable, repositionable, or re-orientable portion or member of the housing 502. The manual discharge member 510 is configured to removably couple with the housing 502 in a first position (e.g., a first state) or orientation where the manual discharge member 510 functions as a portion of the housing 502, and a second position or orientation where the manual discharge member 510 functions to initiate a complete discharge of the cells 504 (e.g., a closed state or position, a second state). In some embodiments, the manual discharge member 510 is positioned over an opening 524 (e.g., a hole, a window, an aperture, a bore, a space, etc.) and is configured to be fastened to the housing 502 via one or more fasteners 516 and openings 526 that are formed or define in the housing 502 and disposed in an array or pattern surrounding the opening 524. In some embodiments, the manual discharge member 510 includes corresponding openings 540 that are configured to receive the fasteners 516 therethrough such that the manual discharge member 510 can be fastened to the housing 502 over the opening 524.

Figure 6:
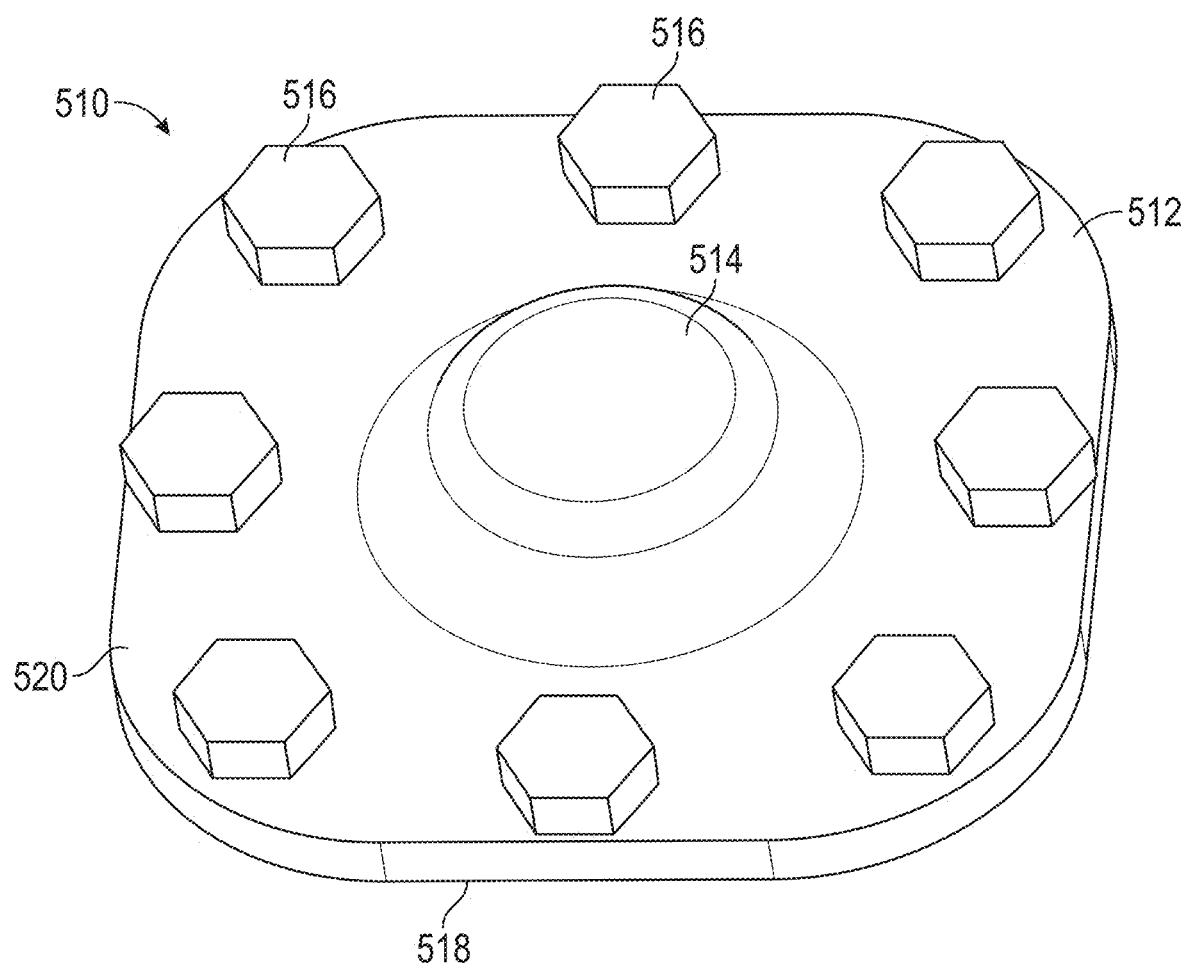
FIG. 6 is a perspective view of a member of the battery of FIG. 5 including a protrusion on one side, according to some embodiments.
Figure 7:
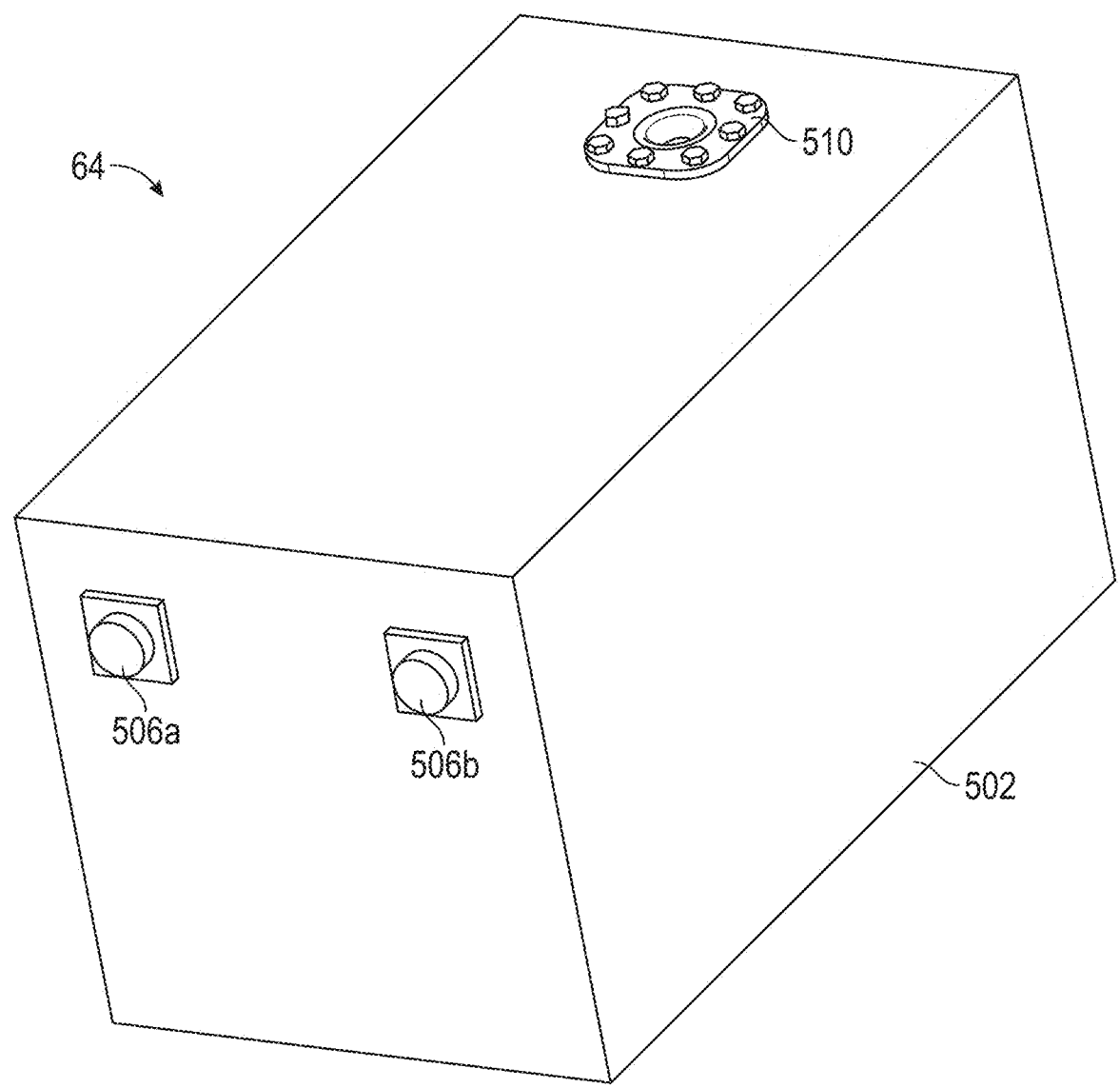
FIG. 7 is a perspective view of the battery of FIG. 5, according to some embodiments.
Figure 8:
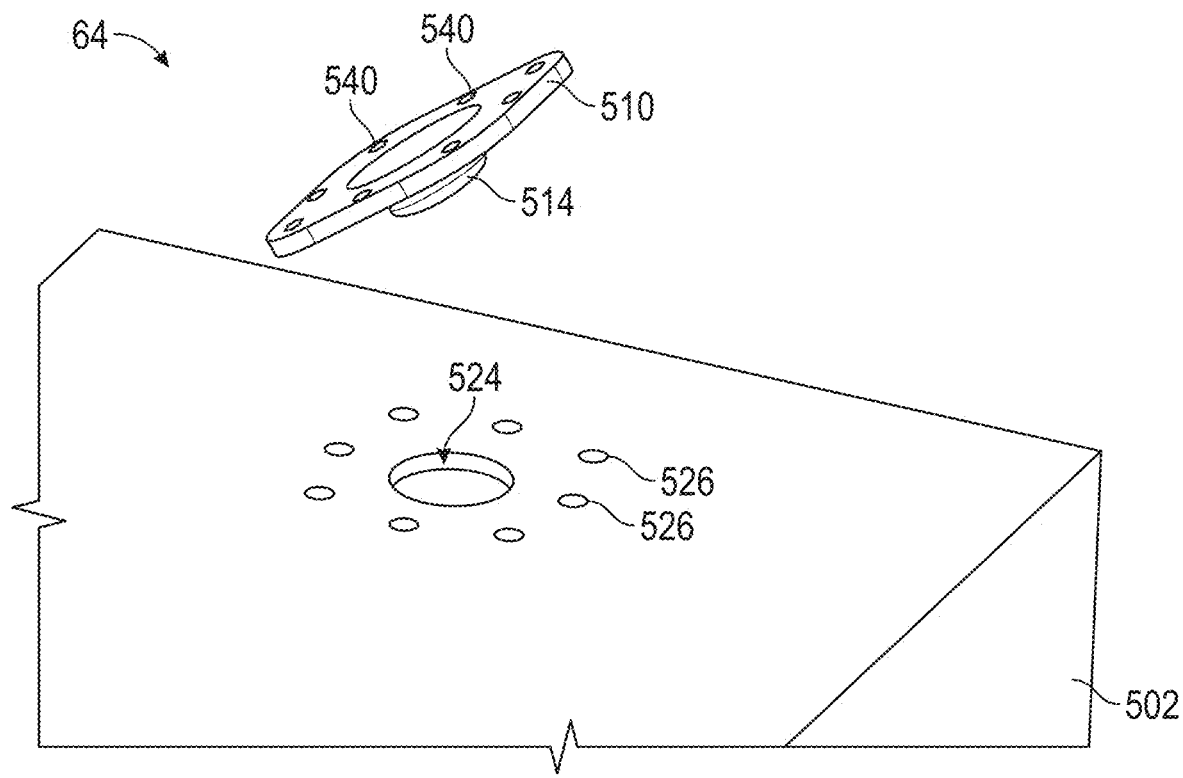
FIG. 8 is a perspective view of a portion of the top of the battery of FIG. 5 with the member of FIG. 7 removed, according to some embodiments.
Figure 9:
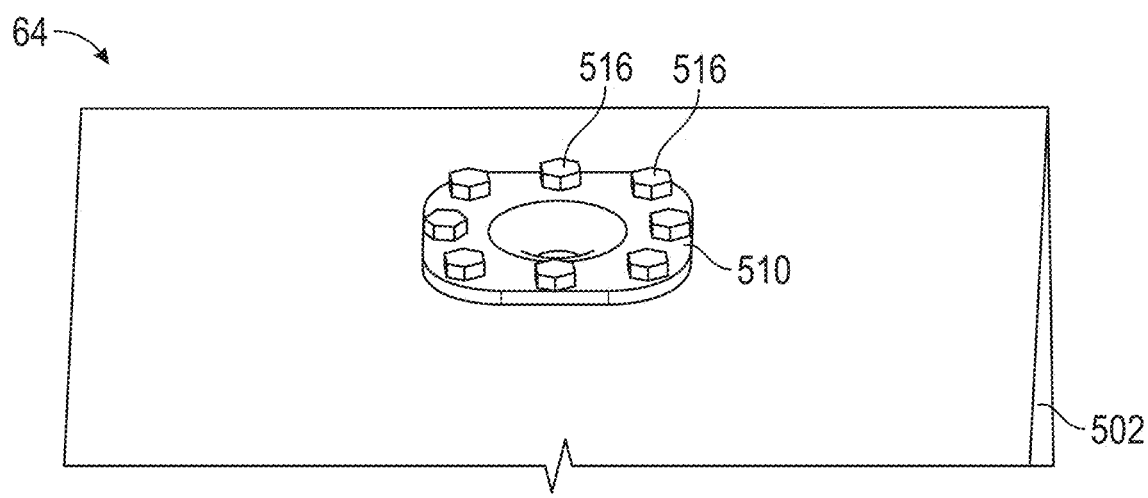
FIG. 9 is a perspective view of a portion of the top of the battery of FIG. 5 with the member of FIG. 7 installed in a second position, according to some embodiments.

Referring particularly to FIGS. 6 and 8, the manual discharge member 510 may have the form of a plate or planar member, shown as plate 512 having a first side 518, and a second side 520 (e.g., a first and second surface, a first and second face, opposing faces or surfaces, opposing sides that are offset from each other, etc.). In some embodiments, the manual discharge member 510 has a generally square or rectangular shape with rounded corners. In some embodiments, the manual discharge member 510 has a circular or elliptical shape. The manual discharge member 510 includes a protrusion 514 (e.g., an extension, geometry that extends outwards, etc.) that extends from the second side 520, according to some embodiments. The protrusion 514 may extend a distance from the second side 520. In some embodiments, the protrusion 514 is positioned centrally on the second side 520. The protrusion 514 may be configured to engage an internal member of the battery 64 in order to initiate discharge of the cells 504. When the manual discharge member 510 is in the first position or orientation, the first side 518 of the manual discharge member 510 faces or contacts the housing 502 and the protrusion 514 faces outwards. When the manual discharge member 510 is in the second position or orientation, the second side 520 of the manual discharge member 510 faces or contacts the housing 502 such that the protrusion 514 extends through the opening 524 and is received within the inner volume 508 of the housing 502. In some embodiments, the manual discharge member 510 may be maintained in the first position over a lifetime of the battery 64, and when complete discharge or manual discharge of remaining energy in the cells 504 is desired (e.g., at an end of the life of the battery 64), the manual discharge member 510 may be flipped over such that the protrusion 514 extends into the inner volume 508 of the housing 502 (e.g., the second position or orientation) in order to initiate the discharge or depletion of the remaining energy in the cells 504 for safe handling of the battery 64.

Referring particularly to FIGS. 10A-10B and 11A-11B, the manual discharge member 510 is shown in the first position (shown in FIG. 10A) and the second position (shown in FIG. 10B), according to some embodiments. When the manual discharge member 510 is in the first position as shown in FIG. 10A, the protrusion 514 extends outwards from the housing 502. As shown in FIGS. 10A and 10B, the battery 64 includes a seal 546 (e.g., an O-ring a flexible member, a sealing member, etc.) positioned between the manual discharge member 510 and the housing 502. The seal 546 facilitates sealing between the manual discharge member 510 and the housing 502 when the manual discharge member 510 is in the first position or the second position. In some embodiments, the seal 546 is compressed between the manual discharge member 510 and the housing 502 when the manual discharge member 510 is installed and fastened onto housing 502. The seal 546 facilitates maintaining integrity of the inner volume 508 and reduces a likelihood that moisture may leak into the inner volume 508 of the housing 502.

Referring still to FIGS. 10A and 10B, the battery 64 includes a positive internal terminal 542 of the cells 504 (e.g., a cathode) and a negative internal terminal 544 (e.g., a ground). In some embodiments, the battery 64 includes a conductor 528 (e.g., an electrically conductive element) that is coupled with (e.g., directly contacts with) the positive internal terminal 542 such that the conductor 528 can define an electrical energy flow path (e.g., a discharge path). The battery 64 also includes a wire 530 (e.g., a cable, a cord, a copper wire, a conductive element, etc.) including a resistor 532. The battery 64 also includes an adjustable conductive assembly including a conductor 536, an insulator 534, and a conductive tip 538 (e.g., a conductive protrusion, a bump, etc.). The wire 530 may electrically couple with the conductor 536. In some embodiments, the wire 530 is sandwiched between the insulator 534 and the conductor 536. The insulator 534 may be provided on a first side of the conductor 536 that faces the opening 524. The conductive tip 538 may be provided on a second side of the conductor 536 proximate or facing the negative internal terminal 544 (e.g., the ground, the anode or negative terminal of the battery cells 504). In some embodiments, the insulator 534 and the conductor 536 are structurally secured relative to the housing 502 of the battery 64 or relative to the cells 504. For example, the insulator 534 and the conductor 536 may be fastened, secured, fixed, or rotatably coupled with the housing 502 at a first end 552 (e.g., a fixed end). In some embodiments, the insulator 534, the conductor 536, and the conductive tip 538 have the form of a cantilever beam including a fixed and a free end.

Referring to FIGS. 10A-10B, the manual discharge member 510 may be transitionable between the first position or orientation, shown in FIG. 10A, and the second position or orientation, shown in FIG. 10B. When the manual discharge member 510 is transitioned into the second position or orientation, shown in FIG. 10B, the protrusion 514 of the manual discharge member 510 is configured to contact, abut, or directly engage the insulator 534 and thereby drive deflection or movement of the conductor 536 such that the conductive tip 538 contacts, abuts, directly engages, etc., the negative internal terminal 544. When the conductive tip 538 contacts the negative internal terminal 544, electrical current flows between the positive internal terminal 542 and the negative internal terminal 544, through the conductor 528, the resistor 532, the wire 530, the conductor 536, and the conductive tip 538. In this way, the cells 504 may discharge any remaining electrical energy (e.g., residual energy) until the cells 504 are completely depleted of energy and the battery 64 can be properly disposed of. In some embodiments, the conductive tip 538 may be bias into or out of engagement with the negative internal terminal 544 by transitioning the manual discharge member 510 between the first position or orientation (shown in FIG. 10A) and the second position or orientation (shown in FIG. 10B). In this way, the manual discharge member 510 may be transitionable between the first position or orientation and the second position or orientation in order to define an electrical flow path for discharge of the cells 504 (e.g., to permanently and completely discharge the cells 504). In some embodiments, the energy is dissipated at least partially as heat generated by transferring the remaining electrical energy through the resistor 532.

Referring to FIGS. 11A and 11B, the battery 64 may also include a spacer 550 (e.g., an insulator, a rubber member, a ring, a foam member, etc.). The spacer 550 may have the form of a cylindrical or square member including a central opening within which the conductive tip 538 is received. In some embodiments, the spacer 550 is positioned on top of the negative internal terminal 544. The spacer 550 may reduce a likelihood that the conductive tip 538 may accidentally engage or contact the negative internal terminal 544 (e.g., accidental shorting or discharge). In some embodiments, the spacer 550 is configured to compress and allow the conductive tip to engage the negative internal terminal 544 when the manual discharge member 510 is transitioned from the first orientation to the second orientation as shown in FIGS. 12A-12B.

Figure 12:
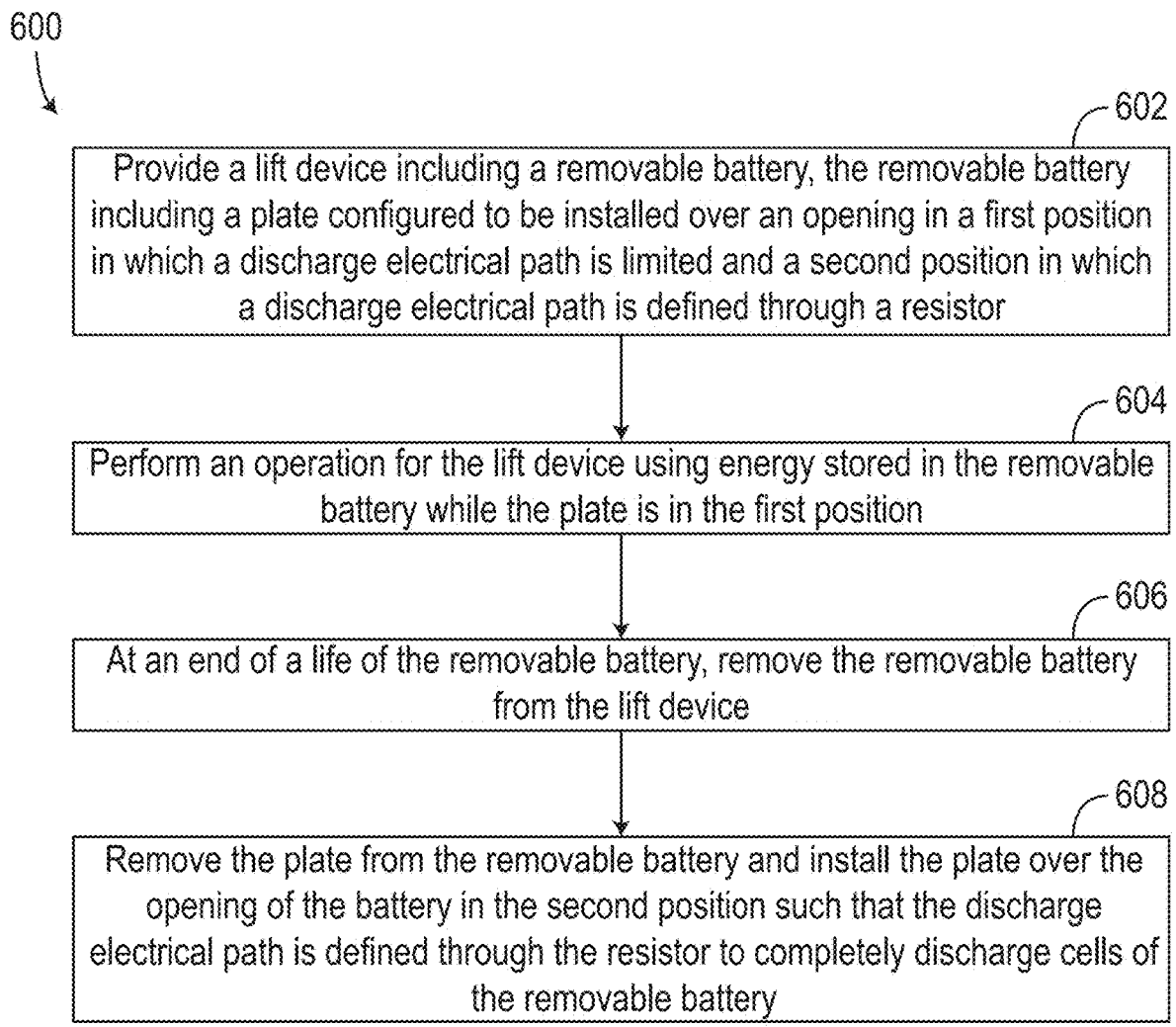
FIG. 12 is a flow diagram of a process for using and discharging a battery of electrical equipment, according to some embodiments.

Referring to FIG. 12, a flow diagram of a process 600 for manually discharging or completely depleting a battery of a lift device or other electrical machine includes steps 602-608, according to some embodiments. In some embodiments, the process 600 is a method for decommissioning a battery at an end of its useful life. In some embodiments, steps 602-608 can be performed to use the battery for one or more functions (e.g., to power an electrical load such as lighting devices, electric motors, electric linear actuators, etc.) during a lifetime of the battery, and to permanently discharge (e.g., completely discharge or deplete cells of the battery) the battery at an end of a life of the battery. Advantageously, the process 600 facilitates improved handling and disposal of batteries that have reached an end of their useful life.

The process 600 includes providing a lift device including a removable battery, the removable battery including a plate configured to be installed over an opening in a first position (e.g., an open state) in which a discharge electrical path is limited and a second position in which a discharge electrical path is defined through a resistor (step 602), according to some embodiments. In some embodiments, the lift device is the lift device 10 and the removable battery is one of the batteries 64 as described in greater detail above with reference to FIGS. 1-11B. In some embodiments, the battery is a quick connect or disconnect battery. In other embodiments, the battery is fastened or secured on the lift device and is intended only to be removed during servicing operations of the lift device. The plate may be the manual discharge member 510 which is coupleable (e.g., fastenable) on the housing 502 of the removable battery in either the first position or orientation or the second position or orientation as described in greater detail above with reference to FIGS. 10A-10B and 11A-11B.

The process 600 includes performing an operation for the lift device using energy stored in the removable battery while the plate is in the first position (step 604), according to some embodiments. In some embodiments, step 604 is performed repeatedly over a lifetime of the removable battery. Step 604 may include any charging or discharging operations of the removable battery. For example, the battery may discharge electrical energy to one or more electrical loads of the lift device 10 to perform driving operations, lifting operations, lighting operations, leveling operations, etc. The battery may be charged at appropriate intervals. Over a lifetime of the removable battery, one or more of the cells that store, receive, and discharge energy may degrade, thereby reducing an effectiveness of the removable battery (e.g., degradation due to usage of the cells). In some embodiments, step 604 is performed by the electric motor 52, the actuators 34, or any other electrical components of the lift device 10 using energy provided by the removable battery.

The process 600 includes, at an end of a life of the removable battery, removing the removable battery from the lift device (step 606) and removing the plate from the removable battery, and re-installing the plate over the opening of the battery in the second position such that the discharge electrical path is defined through the resistor such that the cells of the removable battery completely discharge any remaining energy (step 608), according to some embodiments. In some embodiments, steps 606 and 608 are performed by a technician. When the technician removes the plate and re-installs the plate in the second position, a positive terminal of the cells of the removable battery may be grounded through a resistor such that any remaining energy in the cells (e.g., residual energy) is completely depleted and at least partially converted into heat by the resistor. The discharge electrical path can be defined using any configuration of components as described in greater detail above with reference to FIGS. 10A-10B and 11A-11B.

It should be understood that while the process 600 as described herein is described as being useful at an end of a life of a battery, the process 600 can also be performed for any battery that is to be transported (e.g., damaged batteries, defective batteries, end-of-life batteries, or any other battery that should be fully discharged). Advantageously, the techniques described herein with reference to FIGS. 5-12 facilitate complete discharge of batteries of battery packs that may have a high voltage (e.g., 300 volts or greater across the terminals). The opening 524 in the housing 502 of the battery 64 may also provide access to measure cell stack voltage with a volt meter in order to confirm that the cells 504 of the battery 64 have been fully discharged or depleted.

Figure 13:
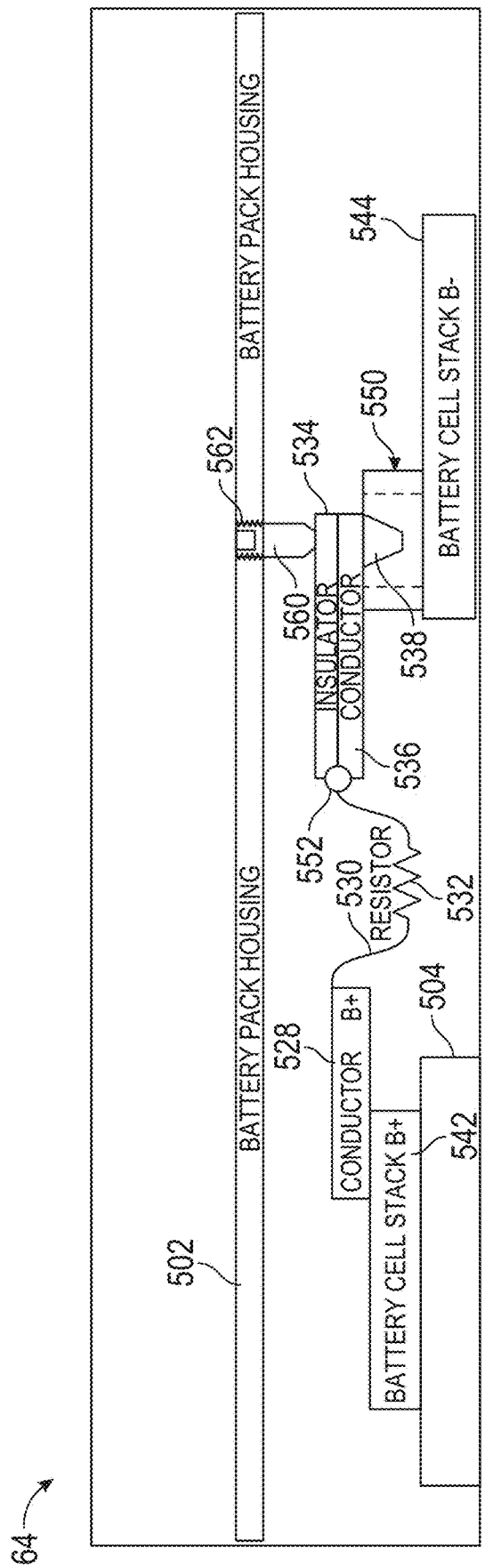
FIG. 13 is a sectional view of the interior of the battery of FIG. 5 including another discharge mechanism that includes a screw to initiate discharge of the battery, according to some embodiments.

Referring to FIG. 13, the conductor 536 or the conductive tip 538 may otherwise be driven into engagement with the negative internal terminal 544 such as by a screw 560 (e.g., a grub screw) that is received through an opening 562 in the housing 502. In some embodiments, the screw 560 is sub-flush with an exterior surface of the housing 502. The screw 560 may be threadingly coupled with an inner surface of the housing 502 such that the screw 560 can be driven (e.g., by a technician) to engage the insulator 534 and translate, bend, rotate, or deform the conductor 536 into engagement with the negative internal terminal 544 (e.g., at the conductive tip 538). In some embodiments, the conductor 536 is otherwise driven to contact or electrically couple with the negative internal terminal 544 in order to discharge or deplete the cells 504. Advantageously, the systems and methods described herein with reference to FIGS. 5-14 facilitate an internal mechanism for discharging the cells 504 of the battery 64.

Configuration of the Exemplary Embodiments

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the lift device 10 and battery 64 as shown in the various exemplary embodiments is illustrative only. Additionally, any element disclosed in one embodiment may be incorporated or utilized with any other embodiment disclosed herein. It should be appreciated that elements of the various embodiments may be incorporated or utilized with any of the other embodiments disclosed herein.

What is claimed is:

1. A battery pack for a lift device, the battery pack comprising:
   a housing comprising an opening;
   a plurality of battery cells positioned within the housing;
   a resistor electrically coupled with a positive terminal of the plurality of battery cells and positioned within the housing;
   a conductive element positioned within the housing and configured to transition between an open state in which a discharge path is not defined between the positive terminal of the plurality of battery cells and a negative terminal or a ground, and a closed state in which the discharge path is defined between the positive terminal of the plurality of battery cells to the negative terminal or the ground through the resistor; and
   a member disposed at the opening and accessible from an exterior of the housing, the member manually transitionable by a technician between a first state in which the conductive element is in the open state, and a second state in which the conductive element is driven into the closed state such that the plurality of battery cells discharge remaining electrical energy via the discharge path;
   wherein the member comprises:
      a plate having a protrusion in a center, wherein in the first state the member is fastened over the opening such that the protrusion is external to the housing, and wherein in the second state the member is fastened over the opening such that the protrusion extends into the housing through the opening and drives the conductive element into the closed state; or a screw configured to be received within the opening, the screw configured to be accessed from the exterior of the housing by the technician such that the screw is driven to rotate to translate into the second state to bias the conductive element into the closed state.

2. The battery pack of claim 1, wherein the conductive element comprises a cantilever beam including a fixed end and a free end, the conductive element configured to be driven by the member to bend such that a protrusion of the free end engages the negative terminal or the ground in the closed state.

3. The battery pack of claim 1, wherein the battery pack comprises an insulator disposed on a side of the conductive element opposite a side from which a protrusion extends, the member configured to engage the insulator to transition the conductive element from the open state to the closed state.

4. The battery pack of claim 1, further comprising a spacer disposed on a tip of the conductive element, the spacer configured to align the tip of the conductive element and deform as the conductive element is driven by the member to the closed state.

5. The battery pack of claim 1, wherein the conductive element comprises a cantilever beam including a fixed end coupled with the housing and a free end configured to be driven to engage the negative terminal or the ground in the closed state.

6. A lift device, comprising:
a lift assembly configured to raise or lower;
a battery pack configured to provide electrical energy to the lift assembly, the battery pack comprising:
a housing comprising an opening;
a plurality of battery cells positioned within the housing;
a resistor electrically coupled with a positive terminal of the plurality of battery cells and positioned within the housing;
a conductive element positioned within the housing and configured to transition between an open state in which a discharge path is not defined between the positive terminal of the plurality of battery cells and a negative terminal or a ground, and a closed state in which the discharge path is defined between the positive terminal of the plurality of battery cells to the negative terminal or the ground through the resistor, wherein the conductive element comprises a cantilever beam including a fixed end coupled with the housing and a free end configured to be driven to engage the negative terminal or the ground in the closed state; and
a member disposed at the opening and accessible from an exterior of the housing, the member manually transitionable by a technician between a first state in which the conductive element is in the open state, and a second state in which the conductive element is driven into the closed state such that the plurality of battery cells discharge remaining electrical energy via the discharge path.

7. The lift device of claim 6, wherein the member comprises a plate having a protrusion in a center, wherein in the first state the member is fastened over the opening such that the protrusion is external to the housing, and wherein in the second state the member is fastened over the opening such that the protrusion extends into the housing through the opening and drives the conductive element into the closed state.

8. The lift device of claim 6, wherein the member comprises a screw configured to be received within the opening, the screw configured to be accessed from the exterior of the housing by the technician such that the screw is driven to rotate to translate into the second state to bias the conductive element into the closed state.

9. The lift device of claim 6, wherein the conductive element comprises a cantilever beam including a fixed end and a free end, the conductive element configured to be driven by the member to bend such that a protrusion of the free end engages the negative terminal or the ground in the closed state.

10. The lift device of claim 6, wherein the battery pack comprises an insulator disposed on a side of the conductive element opposite a side from which a protrusion extends, the member configured to engage the insulator to transition the conductive element from the open state to the closed state.

11. The lift device of claim 6, further comprising a spacer disposed on a tip of the conductive element, the spacer configured to align the tip of the conductive element and deform as the conductive element is driven by the member to the closed state.

12. The lift device of claim 6, wherein the lift device is a fully electric boom.

13. A battery pack for a lift device, the battery pack comprising:
a housing comprising an opening;
a plurality of battery cells positioned within the housing;
a resistor electrically coupled with a positive terminal of the plurality of battery cells and positioned within the housing;
a conductive element positioned within the housing and configured to transition between an open state in which a discharge path is not defined between the positive terminal of the plurality of battery cells and a negative terminal or a ground, and a closed state in which the discharge path is defined between the positive terminal of the plurality of battery cells to the negative terminal or the ground through the resistor; and
a member disposed at the opening and accessible from an exterior of the housing, the member manually transitionable by a technician between a first state in which the conductive element is in the open state, and a second state in which the conductive element is driven into the closed state such that the plurality of battery cells discharge remaining electrical energy via the discharge path;
wherein the battery pack further comprises at least one of:
(i) an insulator disposed on a side of the conductive element opposite a side from which a protrusion extends, the member configured to engage the insulator to transition the conductive element from the open state to the closed state; or
(ii) a spacer disposed on a tip of the conductive element, the spacer configured to align the tip of the conductive element and deform as the conductive element is driven by the member to the closed state.

\* \* \* \* \*